(12) United States Patent  (10) Patent No.: US 7,626,357 B2
Hoffman et al.  (45) Date of Patent: Dec. 1, 2009

(54) BATTERY CHARGER HAVING A SPRING LOADED PLUNGER CONTACT MECHANISM

(75) Inventors: Peter F. Hoffman, Avon, OH (US); Michael J. Brandon, II, North Ridgeville, OH (US); Mark A. Ferguson, Memphis, NY (US); Donwoong Kang, Camillus, NY (US); Scott W. Osiecki, Skaneateles, NY (US)

(73) Assignee: Eveready Battery Co., Inc., St. Louis, MO (US)

( * ) Notice: Subject to any disclaimer, the term of this patent is extended or adjusted under 35 U.S.C. 154(b) by 351 days.

(21) Appl. No.: 11/672,266

(22) Filed: Feb. 7, 2007

(65) Prior Publication Data

US 2008/0185992 A1  Aug. 7, 2008

(51) Int. Cl.
*H01M 10/46* (2006.01)
(52) U.S. Cl. .................................................... 320/110
(58) Field of Classification Search ................. 320/106, 320/107, 110, 116; 429/96, 97, 98, 99, 100
See application file for complete search history.

(56) References Cited

U.S. PATENT DOCUMENTS

| 3,579,075 | A | 5/1971 | Floyd |
| 4,629,962 | A | 12/1986 | Arakawa |
| 5,628,641 | A | 5/1997 | Hahn |
| 5,659,236 | A | 8/1997 | Hahn |
| 5,686,811 | A | 11/1997 | Bushong et al. |
| 6,384,575 | B1 | 5/2002 | Chen et al. |
| 2006/0071641 | A1 | 4/2006 | Ward |
| 2006/0103347 | A1* | 5/2006 | Shum ..................... 320/110 |
| 2006/0232243 | A1 | 10/2006 | Dabdoub et al. |

FOREIGN PATENT DOCUMENTS

EP  0506439 A  9/1992

OTHER PUBLICATIONS

Patent Cooperation Treaty (PCT), International Search Report and Written Opinion for Application No. PCT/US2008/001318, Filed Jan. 31, 2009, Mailed Mar. 24, 2009, European Patent Office, Netherlands.

* cited by examiner

*Primary Examiner*—Edward Tso
(74) *Attorney, Agent, or Firm*—Gregory J. Adams; Michael C. Pophal

(57) ABSTRACT

An apparatus includes a housing having a first wall and a sliding tray having a second wall that is generally parallel to the first wall. The sliding tray slides between a retracted position and an extended position in which the first and second walls define a battery receiving region in the sliding tray. The apparatus further includes a first battery contact provided in the first wall and a second battery contact proximate to the second wall. The first and second battery contacts electrically communicate with battery charging circuitry, and the second battery contact slides relative to the second wall in a direction that changes a battery receiving distance between the first and second battery contacts.

40 Claims, 9 Drawing Sheets

BATTERY CHARGER HAVING A SPRING LOADED PLUNGER CONTACT MECHANISM

BACKGROUND

The present application generally relates to battery chargers and battery powered appliances and, more particularly, to an electrical contact that receives a battery terminal in a battery charger.

Battery chargers have accommodated a plurality of different sized secondary (rechargeable) batteries simultaneously via multiple, single-battery-receiving bays of different size located in a battery-receiving region. Battery chargers have also accommodated two different sized secondary batteries within a shared or common single-battery-receiving bay. For example, a battery charger has included a single-battery-receiving bay that accepts at any given time either a AA or a AAA sized secondary battery such as nickel-metal hydride (NiMH) battery. For a battery charger to accommodate different sized batteries within the common single-battery-receiving bay, at least one of a pair of electrical contacts used with the single-battery-receiving bay has to be moveable in a direction corresponding to the length of the batteries.

Some battery chargers are relatively large in size. Such battery chargers have had a main housing containing electrical charging circuitry and a battery-receiving region that receives one or more batteries. However, large sized battery chargers can be tedious for users to transport and use. A portable battery charger has been provided with a collapsible or slidable battery-receiving region that retracts towards the housing to reduce the footprint of the battery charger when a battery is not in the battery-receiving region. With a collapsible battery charger, the extent to which the battery-receiving region can retract towards the housing may depend on the mechanism used to position the electrical contact.

A battery charger has included an electrical contact positioning mechanism that, depending on the orientation of the mechanism, interferes with collapsing the battery-receiving region. As a result, the compactability of the battery charger may be limited and the electrical components, such as the battery-receiving electrical contacts, may be exposed to the surrounding environment and, thus, may be damaged by a user or foreign matter. To collapse such a battery charger, the user has to manually position the electrical contact positioning mechanism at an orientation at which the mechanism does not interfere with the sliding battery-receiving region.

SUMMARY

Aspects of the present application address these matters, and others.

In one aspect, an apparatus includes a housing having a first wall and a sliding tray having a second wall that is generally parallel to the first wall. The sliding tray slides between a retracted position and an extended position in which the first and second walls define a battery receiving region in the sliding tray. The apparatus further includes a first battery contact provided in the first wall and a second battery contact proximate to the second wall. The first and second battery contacts electrically communicate with battery charging circuitry, and the second battery contact slides relative to the second wall in a direction that changes a battery receiving distance between the first and second battery contacts.

In another aspect, an apparatus includes a housing having a first wall and a sliding tray having a second wall that is generally parallel to the first wall. The sliding tray slides between a retracted position and an extended position in which the first and second walls define a battery receiving region in the sliding tray. The apparatus further includes a first battery contact that is provided in the first wall and a second battery contact proximate to the second wall. The first and second battery contacts electrically communicate with the battery charging circuitry. A spring-loaded plunger slides the second battery contact with respect to the second wall in a direction that changes a distance between the first and second battery contacts so that the pair of battery contacts is configured to receive different sized batteries.

In another aspect, an apparatus includes a housing having a first wall and a sliding tray having a second wall that is generally parallel to the first wall. The sliding tray slides between a retracted position and an extended position in which the first and second walls define a battery receiving region in the sliding tray. The apparatus further includes a spring having a first end affixed to the housing and a second end affixed to the sliding tray. The spring pulls the sliding tray to the retracted position. The apparatus further includes a first battery contact provided in the first wall and a second battery contact provided in the second wall. The first and second battery contacts electrically communicate with battery charging circuitry. A releasable latch holds the sliding tray in an intermediate position between the retracted and extended position. The intermediate position corresponds to a first battery size and the extended position corresponds to a second battery size.

In another aspect, an apparatus includes a housing having a first wall and a sliding tray having a second wall that is generally parallel to the first wall. The sliding tray slides between a retracted position and an extended position in which the first and second walls define a battery receiving region in the sliding tray. A plurality of gears moves the sliding tray between the closed and the extended positions. A first battery contact is provided in the first wall and a second battery contact is provided in the second wall. The first and second battery contacts electrically communicate with battery charging circuitry. The plurality of gears slides the sliding tray to a first position between the retracted and extended position at which the pair of battery contacts accommodate a first sized battery and a second position between the retracted and extended position at which the pair of battery contacts accommodate a second sized battery.

Those skilled in the art will recognize still other aspects of the present application upon reading and understanding the attached description.

BRIEF DESCRIPTION OF THE DRAWINGS

The present application is illustrated by way of example and not limitation in the figures of the accompanying drawings, in which like references indicate similar elements and in which.

DETAILED DESCRIPTION

Figure 1:
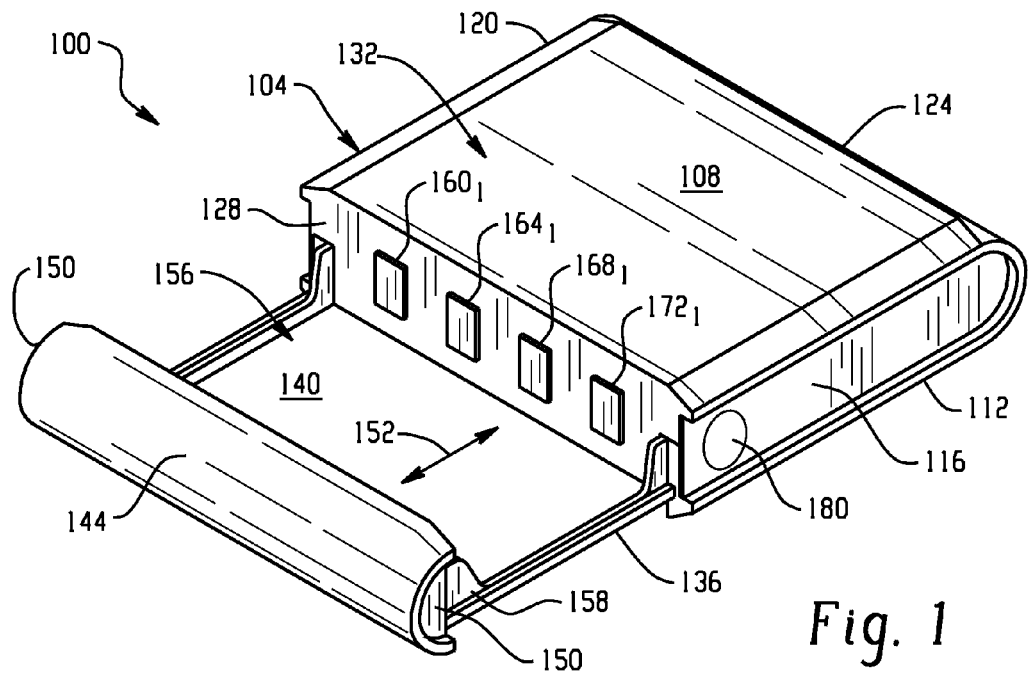
FIGS. 1 and 2 illustrate various perspective views of a battery charger in an open position.
Figure 2:
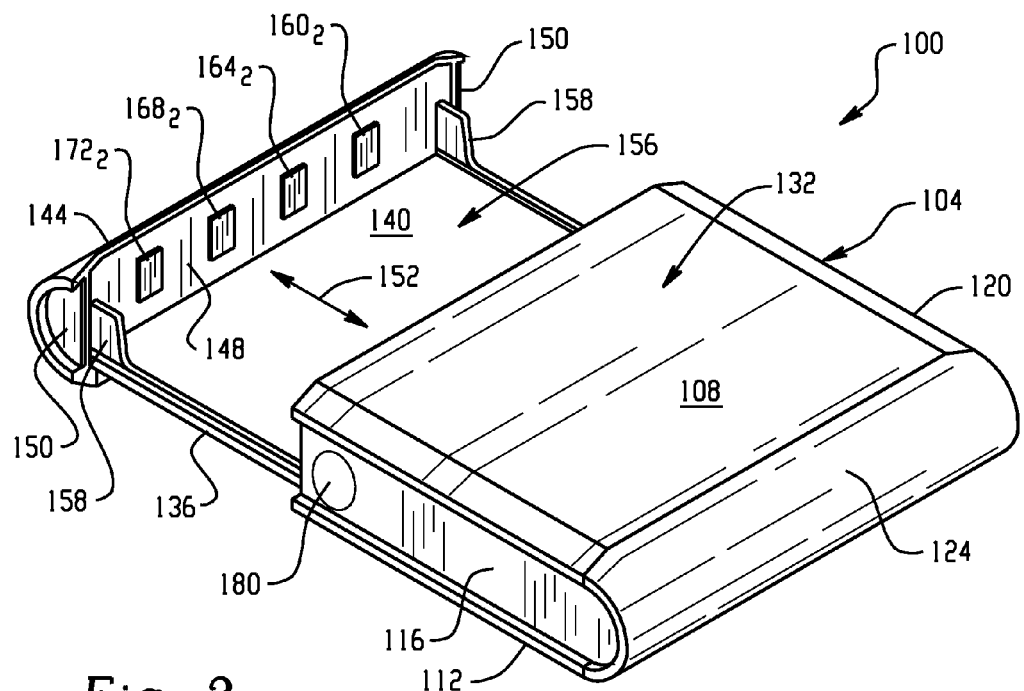
Figure 3:
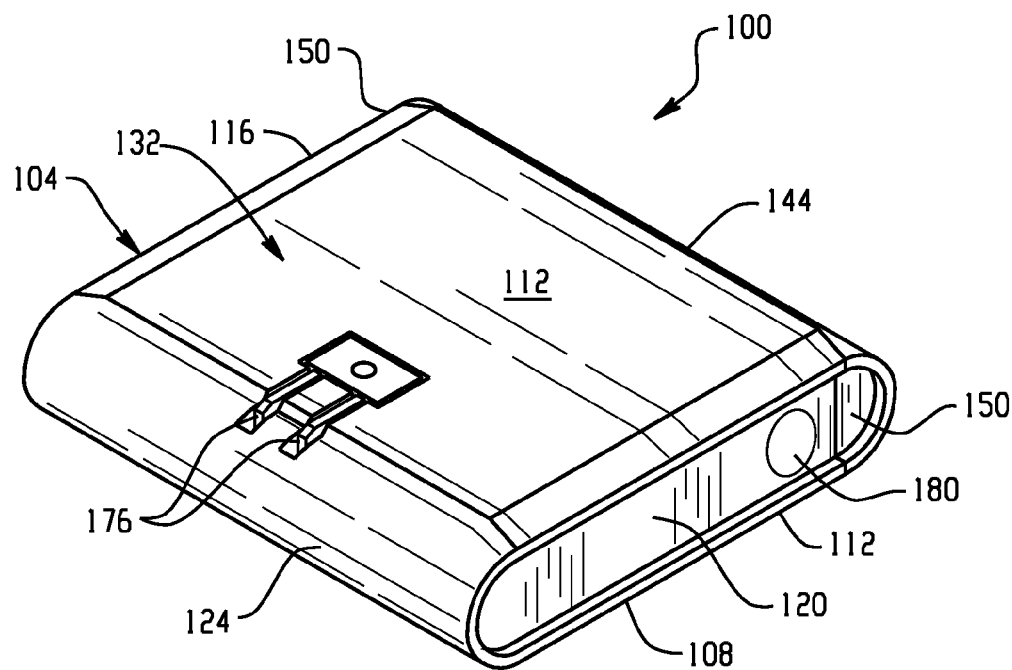
FIGS. 3 and 4 illustrate various perspective views of the battery charger in a closed position.
Figure 4:
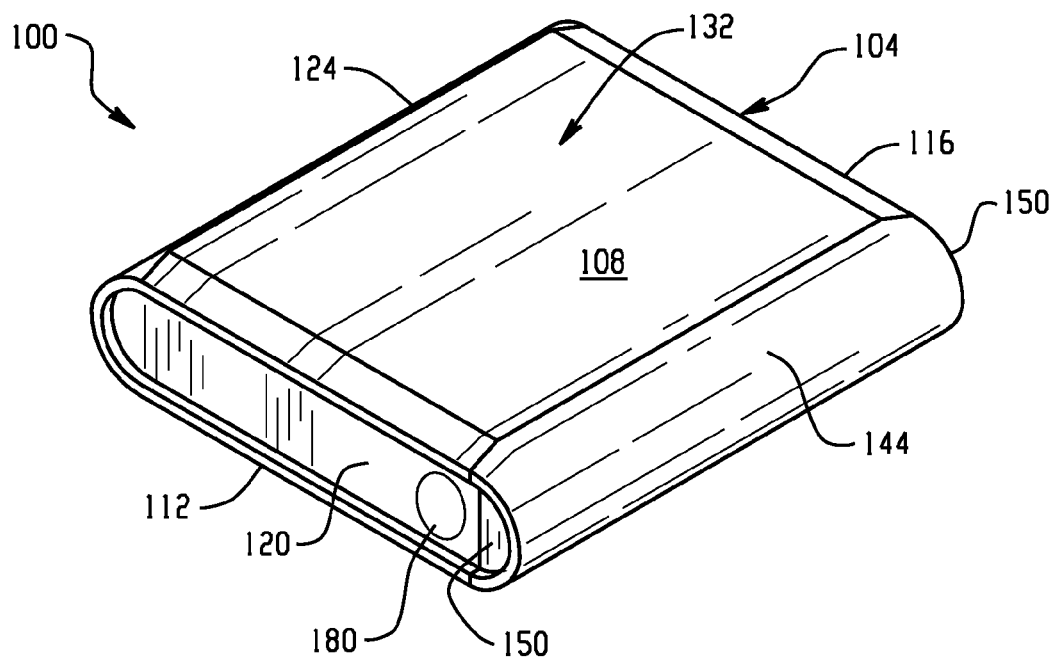

Initially referring to FIGS. 1, 2, 3, and 4, a battery charger 100 includes a main housing 104 having a top wall 108, a bottom wall 112, first and second side walls 116 and 120, a rear wall 124, and an inner wall 128. The walls 108-128 define a generally closed compartment 132, which houses electrical charging circuitry for charging one or more secondary batteries.

The battery charger 100 further includes a sliding tray 136 having a platform 140, a first wall 144, a second wall 148 that is generally parallel to the inner wall 128, and side walls 150. The second wall 148 is disposed between the first wall 144 and the inner wall 128. The platform 140 and the second wall 148 define a battery-receiving region 156 between the inner wall 128 and the second wall 148. In the illustrated example, the battery-receiving region 156 accepts four generally cylindrical secondary batteries having positive and negative terminals located at opposite ends of each battery. An example of suitable batteries includes AA and AAA sized nickel-metal hydride (NiMH) batteries. In other embodiments, the battery-receiving region 156 accepts different numbers, chemistries, and/or sizes of secondary batteries. The sliding tray 136 may also include side walls 158 that extend from the second wall 148 towards the main housing 104 so as to define side boundaries for the platform 140.

The sliding tray 136 is slidably affixed to the main housing 104 and slides along the bottom wall 112 between an extended position (FIGS. 1 and 2) and a retracted position (FIGS. 3 and 4) along an axis 152 that is parallel to the longitudinal axis of a battery inserted into the battery-receiving region 156. When in an extended position, the second wall 148 is separated from the inner wall 128 so that a battery can be received in the platform 140, and when in the retracted position, the second wall 148 is adjacent to or otherwise in close proximity to the inner wall 128. In the retracted position the battery-receiving region 156 is substantially non-existent and the battery charger 100 cannot receive batteries. In this position, the battery charger 100 is relatively compact and portable. In one non-limiting embodiment, the sliding tray 136 is in physical contact with the main housing 104 when retracted to optimize compactness of the battery charger. Retracting the sliding tray 136 as such may also enclose and shield electrical components disposed in the battery-receiving region 156.

In the illustrated example, the inner and second walls 128 and 148 include four pairs of battery contacts 160, 164, 168, and 172 that electrically communicate with respective batteries received in the battery-receiving region 156. Each pair of electrical contacts includes a first battery contact $160_1$, $164_1$, $168_1$, and $172_1$ that electrically communicates with a first terminal of a received battery and a second battery contact $160_2$, $164_2$, $168_2$, and $172_2$ that electrically communicates with a second terminal of the received battery. The various electrical contacts 160, 164, 168, and 172 are also in electrical communication with the charging circuitry via suitable conductors (not shown).

At least one electrical contact of at least one pair of electrical contacts is positionably adjustable so as to increase or decrease the distance between the first and second electrical contacts to accommodate different sized batteries. In one instance, each adjustable electrical contact is individually movable relative to the other electrical contacts. In another instance, two or more of the adjustable electrical contacts move in tandem. The mechanism(s) used to move an electrical contact is described in greater detail below.

The battery charger 100 further includes electrical contacts 176 (FIG. 3) that matingly engage a standard alternating current (AC) electrical receptacle. The electrical contacts 176 are pivotally attached to the main housing 104 about a pivot(s) and pivot between a first position (not shown) in which the electrical contacts 176 perpendicularly extend from the bottom wall 112 for engaging the AC receptacle and a second position (FIG. 3) in which the electrical contacts 176 are generally flush with the bottom wall 112. When matingly engaged with a standard AC electrical receptacle, the electrical contacts 176 receive AC power that is used by the electrical charging circuitry for charging batteries. While shown as being pivotally attached to the main housing 104, it is understood that the electrical contacts 176 can be coupled to the main housing 104 in other manners, such as rotatably coupled along a side wall of the main housing 104, pivotably or rotatably coupled to a region between the walls 144 and 148.

As noted above, the position of a battery-receiving electrical contact(s) 160, 164, 168, 172 of the battery charger 100 is adjustable for receiving a particular sized battery. FIGS. 5-11 describe various mechanisms for positioning the battery-receiving electrical contact(s) 160, 164, 168, 172 as such.

Figure 5:
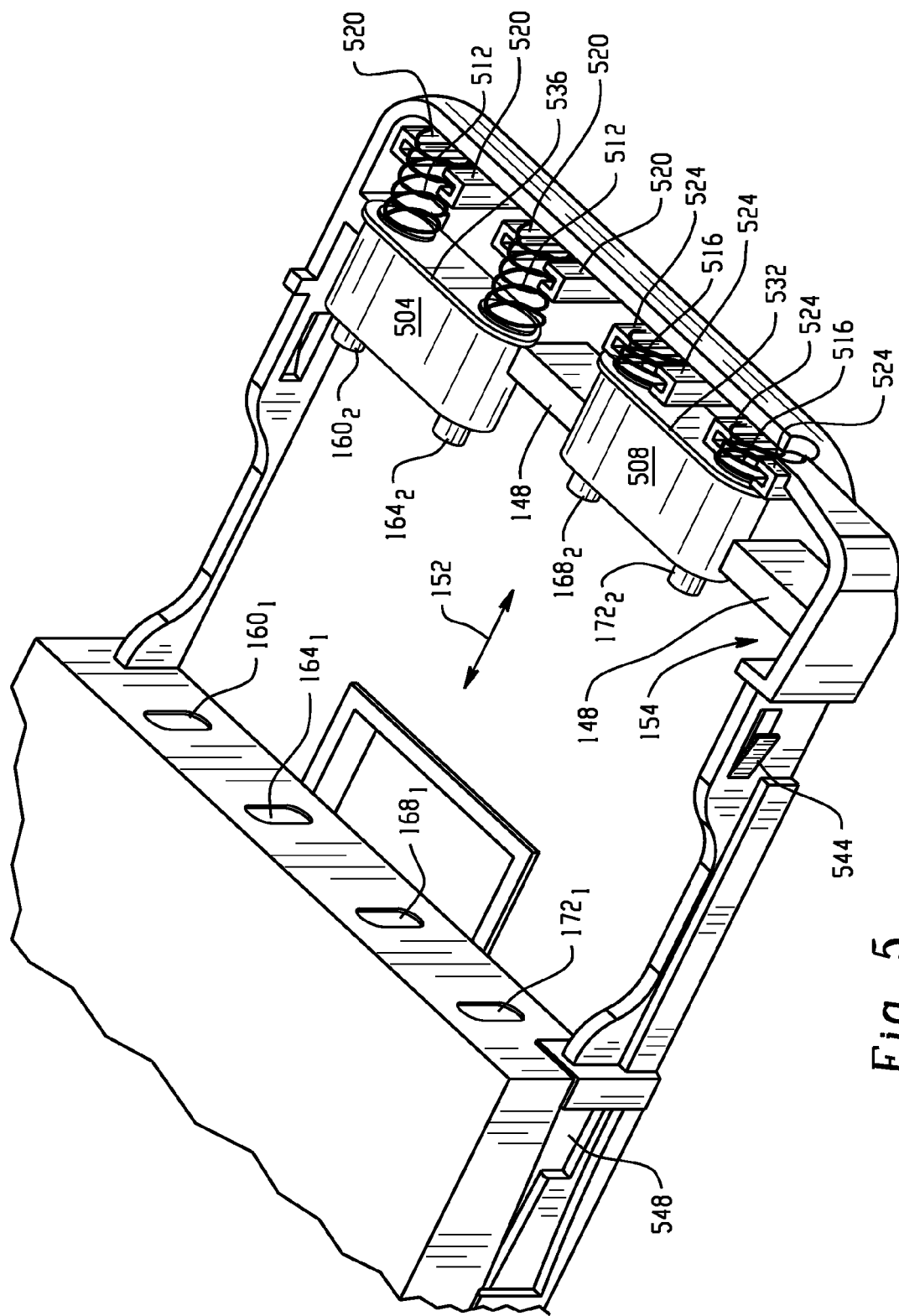
FIGS. 5 and 6 illustrate a spring-loaded plunger that positions the electrical contacts of the battery charger for receiving a battery.

Referring to FIG. 5, a spring-loaded plunger is used to position the second electrical contacts $160_2$, $164_2$, $168_2$, and $172_2$ relative to the first electrical contacts $160_1$, $164_1$, $168_1$, and $172_1$. A cut-away view of the battery charger 100 is shown for ease of explanation. In this example, the second electrical contacts $160_2$ and $167_2$ are partially housed by and protrude from a first plunger 504 and the second electrical contacts $168_2$ and $172_2$ are partially housed by and protrude from a second plunger 508. Pairs of springs 512 and 516 are respectively disposed between and affixed to the plungers 504 and 508 and fixed supports 520 and 524 located within a cavity 154. In an alternative embodiment, a separate spring-loaded plunger carries each electrical contact.

The first and second plungers 504 and 508 are dimensioned so as to slide through material free regions in the second wall 148 up to respective regions 536 and 532 of the plunger members 504 and 508, which are larger than the openings provided by the material free regions so as to provide a mechanical stop for the plungers 504 and 508. The pairs of springs 512 and 516 are preloaded so as to exert a force in the direction of the first electrical contacts $160_1$, $164_1$, $168_1$, and $172_1$ to cause the first and second plungers 504 and 508 to slide through respective material free regions and hence urge the contacts $160_2$, $164_2$, $168_2$, and $172_2$ toward the contacts $160_1$, $164_1$, $168_1$, and $172_1$.

The plunger 504 is shown in an extended position in which the force exerted by the springs 512 causes the plunger 504 to slide through the material free regions up to the region 536, acting as a mechanical stop. The plunger member 504 moves to the extended position when the sliding tray 136 is extended and a battery is not received in the battery-receiving region 156. The plunger 508 is shown in a fully retracted position in which the plunger member 508 physically contacts the supports 524. It is to be understood that a suitable force pushes the plunger 508 into the retracted position. The plunger members 504 and 508 are positioned at intermediate positions when batteries are received in the battery-receiving region 156. When holding batteries, the relative position of the plunger members 504 and 508 depends on the battery size. In this example, the plungers 504 and 508 at least slide between two different positions for receiving two different sized batteries.

A battery is received in the battery-receiving region 156 by moving one of the plunger members 504 and 508 from the extended position towards the retracted position and inserting the battery between corresponding first and second electrical contacts. For example, a user can use a battery terminal of a battery to push the electrical contact $160_2$, $164_2$, $168_2$ and $172_2$ towards the retracted position while the user pivots the battery so as to place the battery between the contacts 160, 164, 168, and 172. Once inserted, the spring 512, 516 force urges the plunger members 504 or 508 to move toward the first electrical contacts $160_1$, $164_1$, $168_1$, and $172_1$, which causes the corresponding second electrical contacts $160_2$, $164_1$, $168_2$, and $172_2$ to exert a suitable contact force on the electrical terminals of the received battery. The battery can be removed when desired by a user.

The battery charger 100 also includes a latch that holds the sliding tray 136 in the closed position when the sliding tray 136 is retracted. The latch includes flexing protrusions or detents 544 located on the side walls 158 of the platform 140 and complementary material free regions 548 in the side walls 112 and 116 of the main housing 104. The detents 544 and the material free regions 548 are physically arranged so that the detents 544 latch with the material free regions 548 when the sliding tray 136 is retracted or closed.

As the sliding tray 136 is retracted to the closed position, the first and second electrical contacts 160, 164, 168, and 172 come into physical contact, which causes the plungers 504 and 508 to retract into the cavity 156 and compress the springs 512 and 516 against the supports 520 and 524. The detents 544 are unlatched by exerting a force on the detents 544 that moves the detents 544 in a direction towards the main housing 104 and out of the material free regions 548. Referring back to FIG. 1-4, such force can be exerted on the detents 544 by applying pressure at 180, which corresponds to respective material free regions 548. When the detents 544 are moved as such, the spring force from the springs 512 and 516 pushes the plungers 504 and 508 and hence the second electrical contacts $160_2$, $164_2$, $168_2$, and $172_2$ against the first electrical contacts $160_1$, $164_1$, $168_1$, and $172_1$, which causes the sliding tray 136 to pop open, or automatically move away from the inner wall 128.

Figure 6:
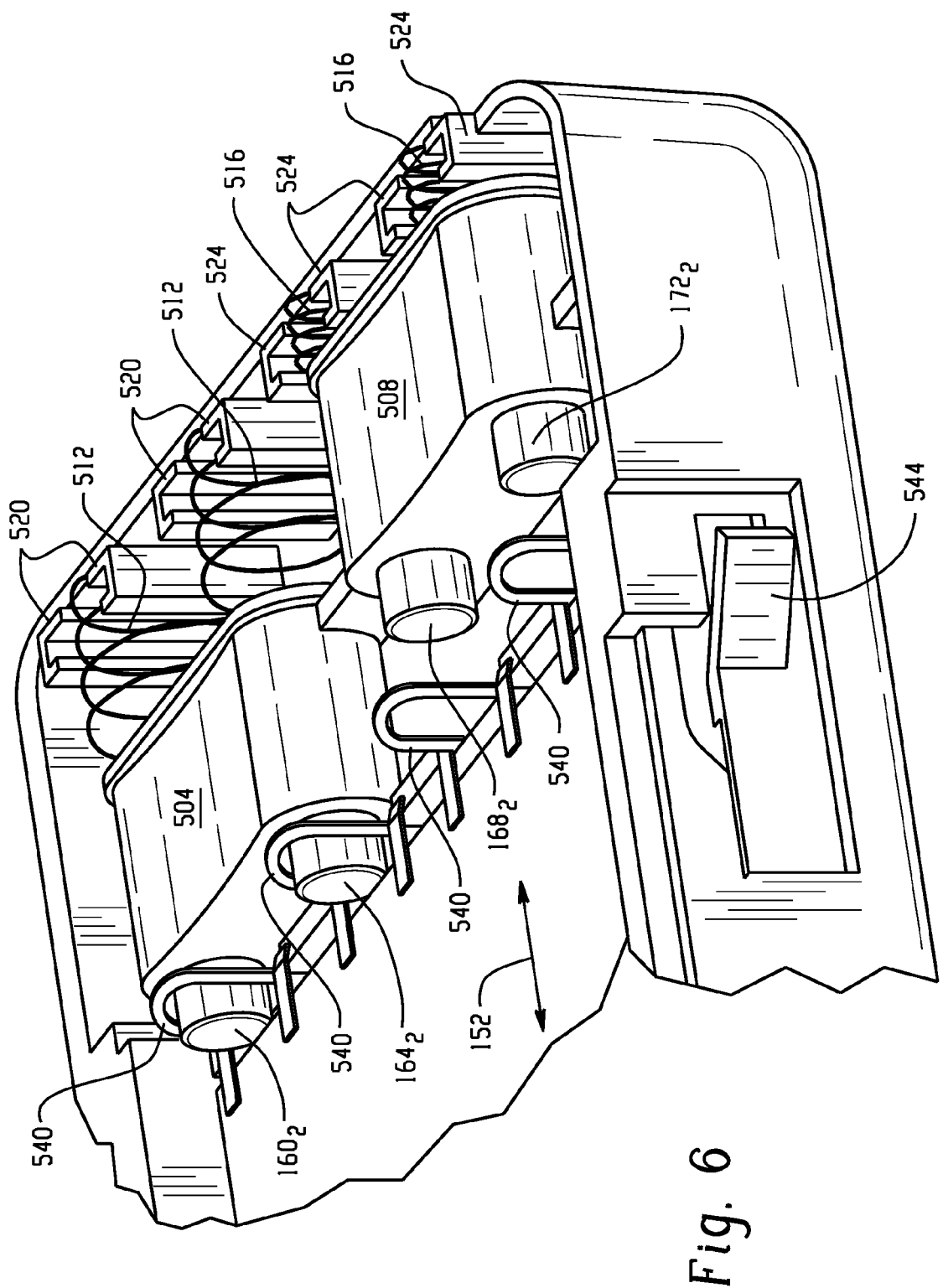

As shown in FIG. 6, contact support brackets 540 can be used to harness or facilitate maintaining suitable alignment of the second electrical contacts $160_2$, $164_2$, $168_2$, and $172_2$ with respect to the first electrical contacts $160_1$, $164_1$, $168_1$, and $172_1$.

Figure 7A:
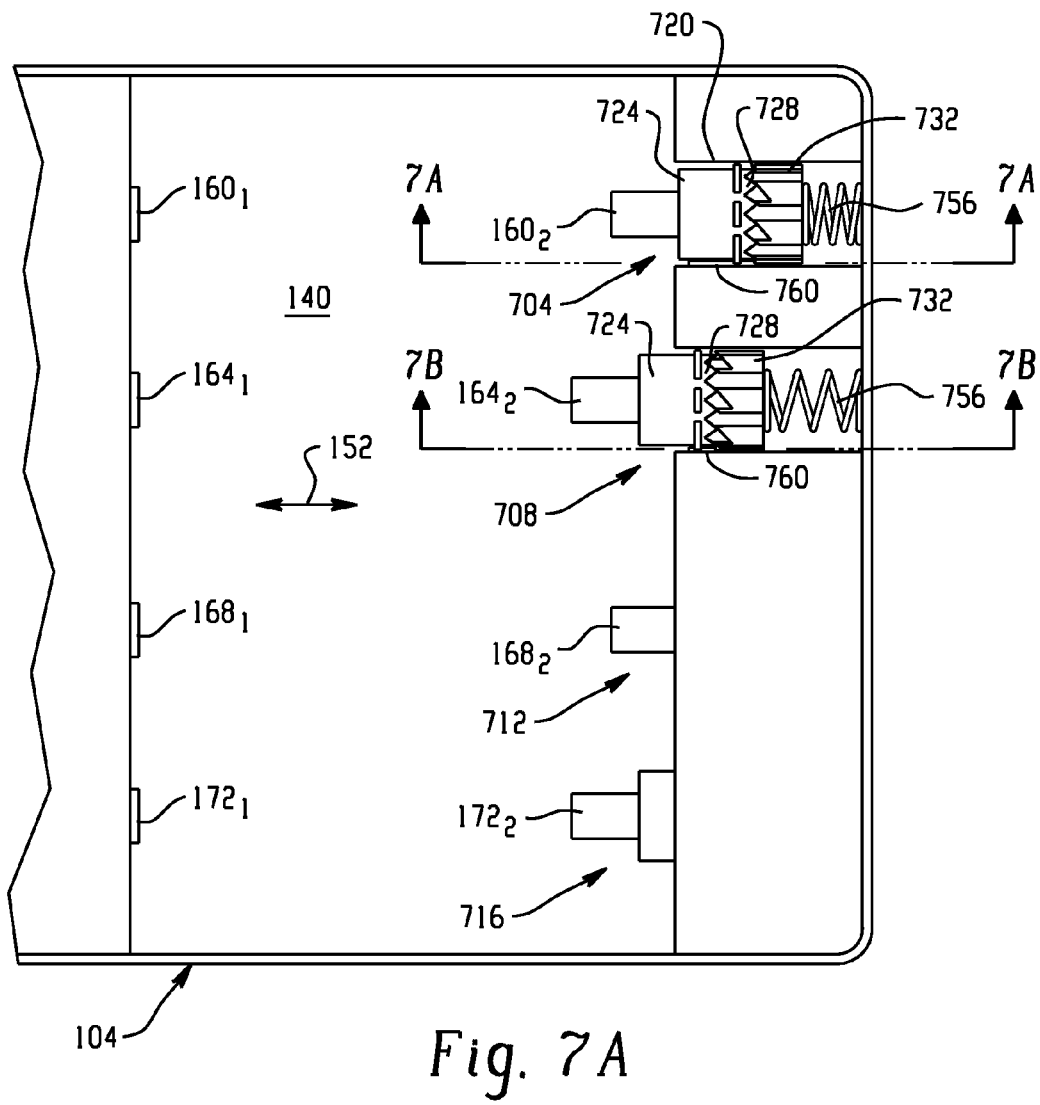
FIGS. 7A, 7B, and 7C illustrate a spring-loaded plunger that positions electrical contacts of a battery charger for receiving a battery.
Figure 7B:
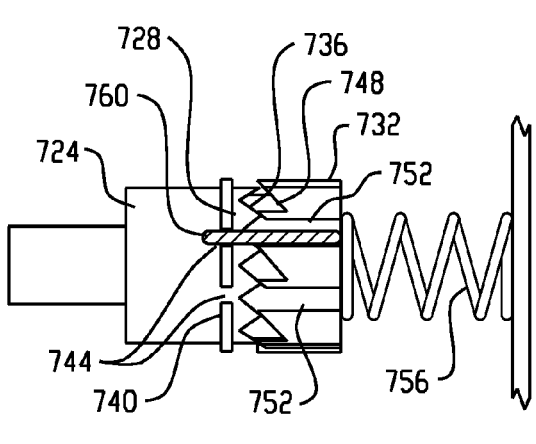
Figure 7C:
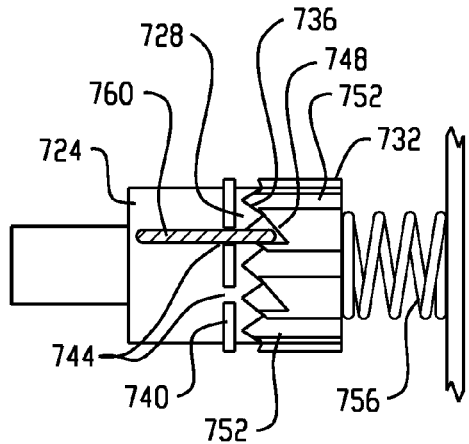

With reference to FIGS. 7A, 7B, and 7C, an alternative spring-loaded plunger approach is illustrated. In the illustrated example, each of the second electrical contacts $160_2$, $164_2$, $168_2$, and $172_2$ is carried by a respective spring-loaded plunger 704, 708, 712, and 716. The plungers 704 and 712 are shown in a first or retracted position in which the second electrical contacts $160_2$ and $168_2$ are positioned for receiving a larger sized battery (FIGS. 7A and 7C). In contrast, the plungers 708 and 716 are shown in a second or extended position in which the second electrical contact $164_2$ and $172_2$ are positioned relatively closer to the first electrical contact $164_1$ and $172_1$ for receiving a relatively smaller sized battery (FIGS. 7A and 7B).

As illustrated, each of the plungers 704-716 slides along the axis 152 within respective casings 720 between the retracted position (plungers 704 and 712) and the extended position (plungers 708 and 716). Each of the plungers 704-716 includes a first end 724 that carries one of the second contacts $160_2$, $164_2$, $168_2$, and $172_2$ and a second end 728 that interacts with a slidable rotating member 732. The second end 728 of the plungers 704-716 includes a plurality of triangular shaped teeth 736 and protrusions 740 that are spaced apart to define a material free region 744. The slideable rotating member 732 includes a plurality of saw tooth shaped teeth 748, which physically contact the triangular shaped teeth 736 of the plunger, and a material free region 752. A spring 756 exerts a force on the slidable rotating member 732 that urges the slidable rotating member 732 towards the first contacts $160_1$, $164_1$, $168_1$, and $172_1$. A protruding arm 760 of the casing 720 operates in cooperation with the plungers 704-716, the slidable rotating member 732, and the spring 756 to rotate and latch the slidable rotating member 732 at positions that correspond to positions for receiving a relatively smaller sized battery and a relatively larger sized battery.

When in the retracted position, the slidable rotating member 732 is at a rotational position such that the spring force urges a triangular shaped tooth 736 of the slidable rotating member 732 to engage the arm, which holds plungers 704 and 712 in the retracted position. When in the extended position, the slidable rotating member 732 is at a rotational position such that the spring force urges the material free region 752 to slide along the arm 760, which holds the plungers 708 and 716 in the extended position. In order to transition one or more of the plungers 704-716 to the other position, the desired plunger and hence the rotating member 732 is slid in a direction away from the first contacts at least until the saw shaped tooth 748 and arm 760 or the material free region 752 and the arm 760 disengage. At this point, the interaction between the teeth 736 and 748 urges the slidable rotating member 732 to rotate such that when the plunger is released the arm 760 interacts with the saw tooth 748 to rotate the slidable rotating member 732 so that the material free region 752 slides along the arm 760 or the a saw tooth 748 and arm 760 engage.

It is to be appreciated that in another embodiment, the first electrical contacts $160_1$, $164_1$, $168_1$, and $172_1$ can additionally or alternatively be carried and positioned by the spring-loaded plungers described in connection with FIGS. 5 and 6, and 7.

Figure 8A:
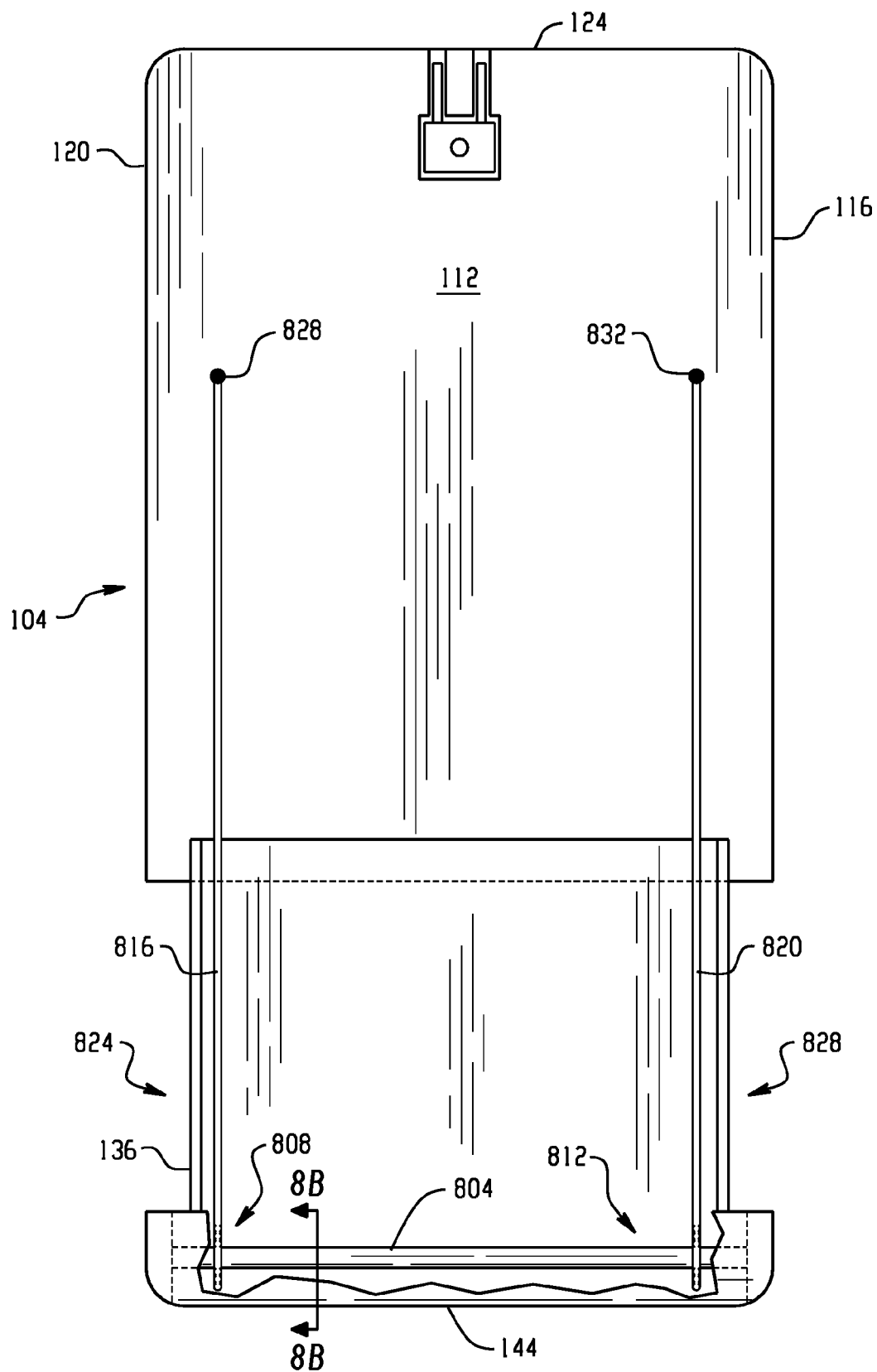
FIGS. 8A and 8B illustrates a constant-force spring that positions electrical contacts of a battery charger for receiving a battery.
Figure 8B:
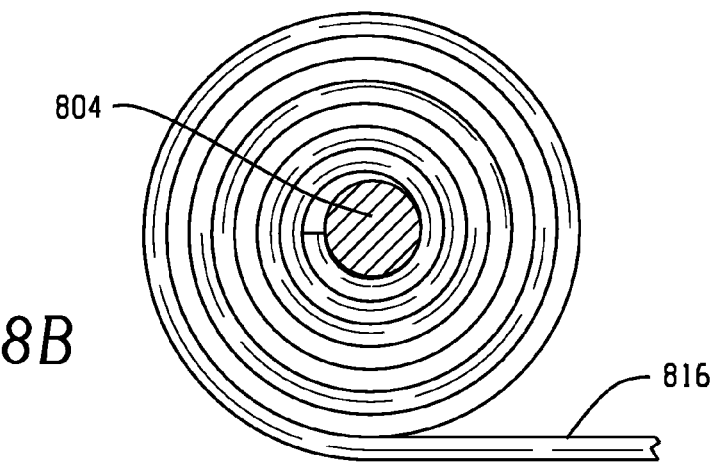

FIG. 8A illustrates an embodiment in which a constant force spring is used to pull the sliding tray 136 and hence pull the second electrical contacts $160_2$, $164_2$, $168_2$, and $172_2$ towards the first contacts $160_1$, $164_1$, $168_1$, and $172_1$. As illustrated, an axle or rod 804 is disposed within the cavity 154 in a direction parallel to the second wall 148. First ends 808 and 812 of respective constant force springs 816 and 820 are affixed to the axle 804. In the illustrated example, the spring 816 is affixed to the axle 804 on a first side 824 of the battery charger 100 and the spring 820 is affixed to the axle 804 on a second side 828 of the battery charger 100. As shown in FIG. 8B, the constant force springs 816 and 820 include spirally wound coils that surround the axle 804. Second free ends 828 and 832 of the springs 816 and 820 are extended from the coil and mechanically affixed to the main housing 104. Inherent stress of the springs 816 and 820 tends to urge the second ends 828 and 832 to wind back onto the coil, thereby pulling the sliding tray 136 and the housing 104 together.

The spring force resists extension of the sliding tray 136 when the sliding tray 136 is closed. As a result, the constant force spring 808 maintains the battery charger 100 in a closed position when batteries are not received in the battery-receiving region 156. A latch, detent, or the like is used to hold the sliding tray 136 in position when the sliding tray 136 is manually extended from the housing 104 to a position at which a first battery of a first size is receive in the battery-receiving region 156. The detent (not visible) may be located on the sliding tray 136 or the bottom wall 112 of the housing 104 with a complementary material free region (not visible) on the bottom wall 112 or sliding tray 136. The latch is released by extending the sliding tray 136 to a fully open position, which corresponds to a position for receiving a second, larger battery. When the latch is released, the spring force exerts a force that encourages the sliding tray 136 to slide to the closed position. However, the sliding tray 136 can be further extended to receive a larger sized battery.

Figure 9:
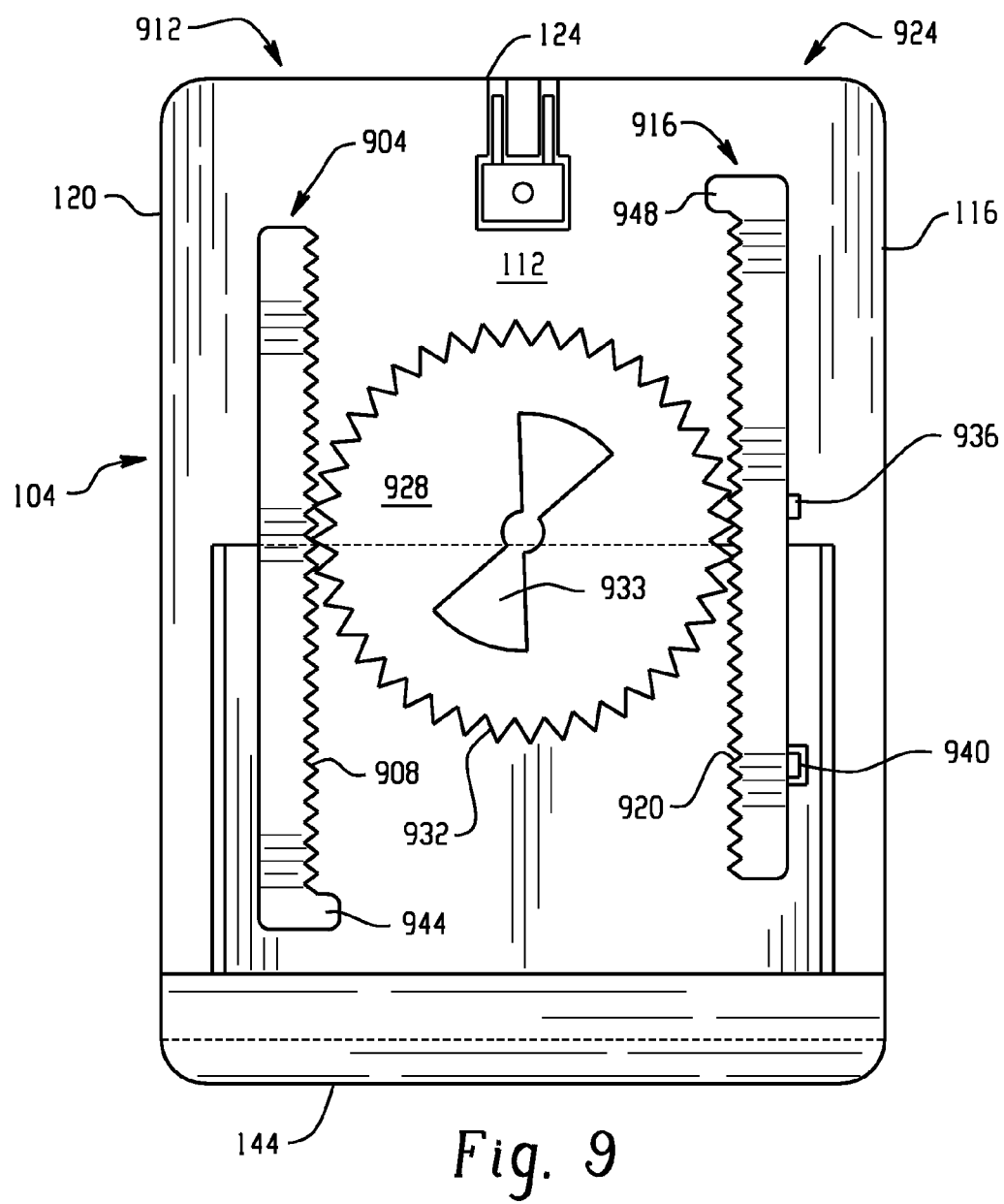
FIGS. 9, 10, and 11 illustrate a rack and pinion that positions electrical contacts of a battery charger for receiving a battery.
Figure 10:
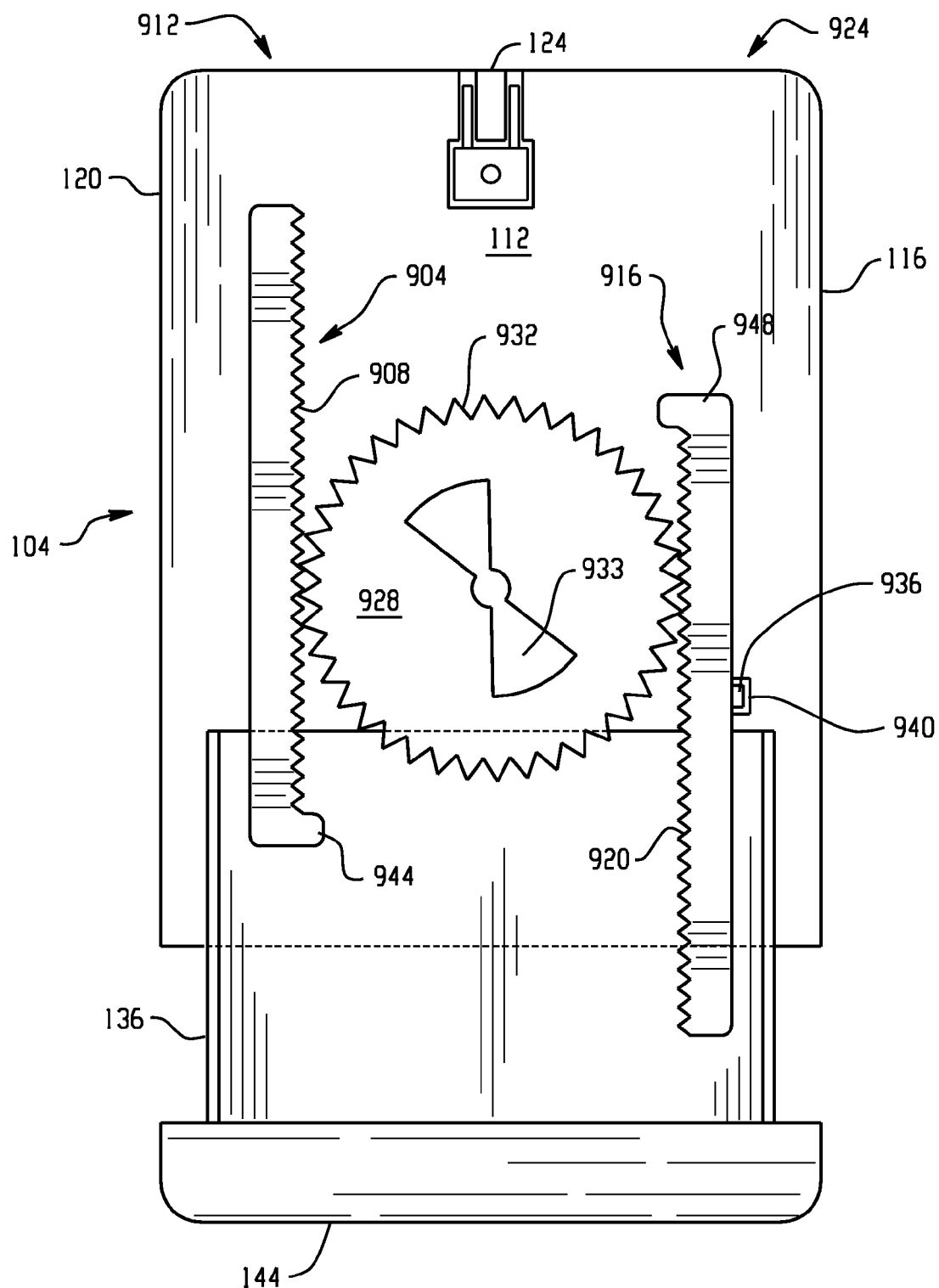
Figure 11:
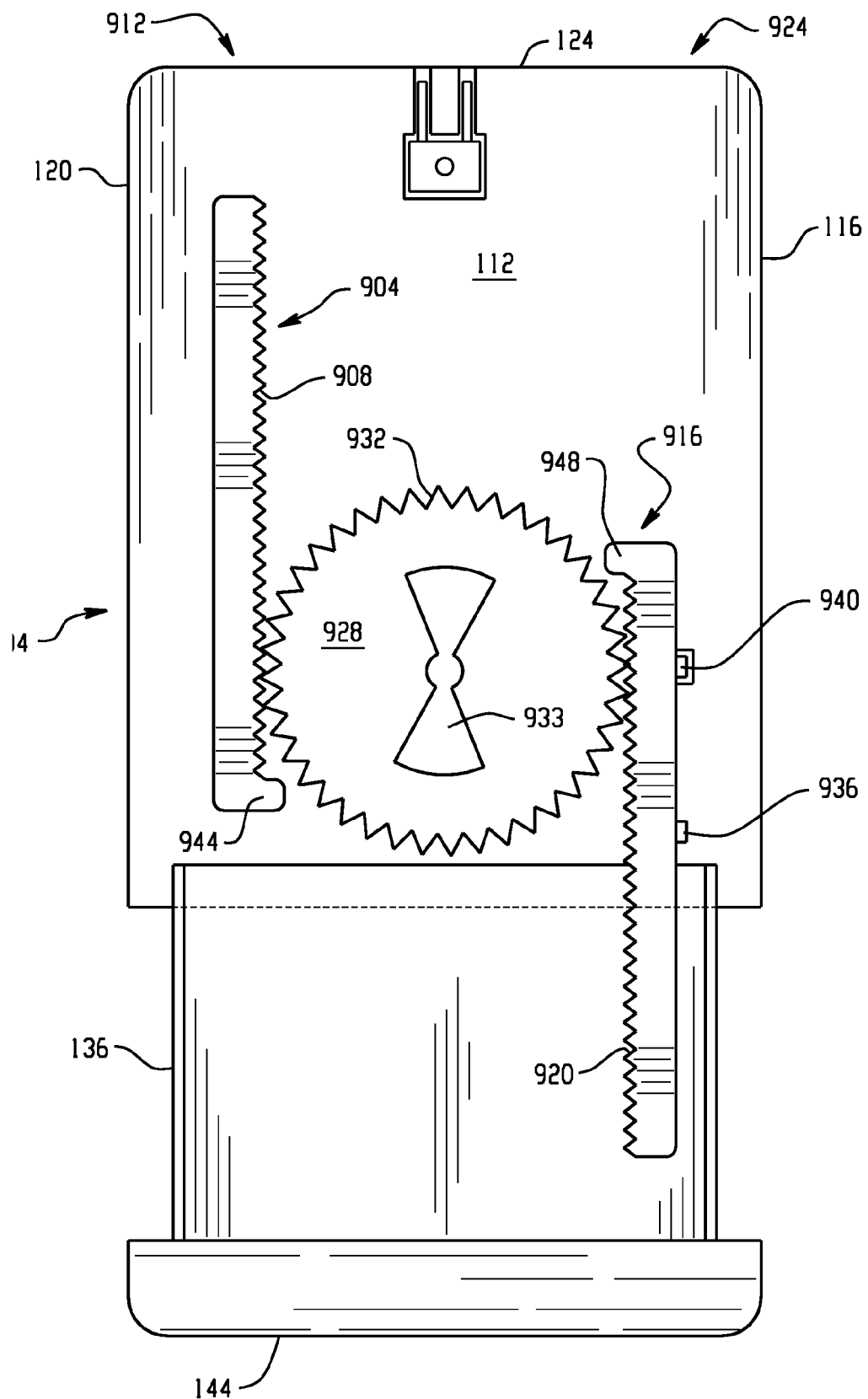

With respect to FIGS. 9, 10, and 11, a plurality of gears are used to move the sliding tray 136 and hence the second electrical contacts $160_2$, $164_2$, $168_2$, and $172_2$. In the illustrated embodiment, a first rack 904 having a first set of teeth 908 is mechanically fixed to the bottom wall 112 on a first side 912 of the charger 100. A second rack 916 having a second set of teeth 920 is mechanically fixed to the sliding tray 136 on a second side 924 of the charger. The first and second racks 904 and 916 are arranged at respective locations so that they lie in substantially the same plane with their respective teeth facing each other. A pinion 928 is disposed between the first and second racks 904 and 916 in substantially in the same plane as the first and second racks 904 and 916. The pinion 928 includes a third set of teeth 932 that currently engages the first and second sets of teeth 908 and 920 when the pinion 928 rotates so as to cause the pinion 928 and the second rack 916 to translate in the same direction with respect to the first rack 904. The pinion 928 is recessed and held in the back wall 112 and includes a grip 933 or the like that a user turns to rotate the pinion 928.

The racks 904 and 916 and the pinion 928 are mechanically arranged with respect to each other so that rotating the pinion 928 in a first direction causes the rack 916 to move in a direction in which the sliding tray 136 retracts into the main housing 104 to the closed position, and rotating the pinion 928 in a second opposite direction causes the rack 916 to move in an opposite direction in which the sliding tray 136 extends away from the main housing 104 to a position(s) for receiving a battery. The second rack 916 includes a protrusion or detent 936 that engages a material free region 940 on the bottom wall 112 when the sliding tray 136 extends to a position for accepting a smaller sized battery. The detent 936 holds the second rack 916 at this position until the user rotates the pinion 928 so as to cause the detect 936 to disengage the material free region 940. Rotating the pinion 928 in either direction disengages the detent 936 and allows the user to rotate the pinion 928 to retract the sliding tray 136 or further extend the sliding tray 136 to a position at which a larger sized battery is accepted into the battery-receiving region 156. An end member 944 of the first rack 904 and an end member 948 of the second rack 916 act as mechanical stops that respectively limit the translational motion of the pinion 928 and the second rack 916, which limits the extent to which the sliding tray 136 extends away from the main housing 104.

FIG. 9 shows the relationship of the racks 904 and 916 and the pinion 928 when the sliding tray 136 is retracted so that battery charger 100 is closed. FIG. 10 shows the relationship of the racks 904 and 916 and the pinion 928 when the sliding tray 136 is extended and held by the detent 936 at a first position where the battery charger 100 receives a first smaller sized battery. FIG. 11 shows the relationship of the racks 904 and 916 and the pinion 928 when the sliding tray 136 is extended to a second position where the battery charger 100 receives a second larger sized battery.

It is to be appreciated that the rack 904 could be omitted. With this configuration, the rotating pinion 928 does not translate. However, rotating the pinion 928 causes the rack 916 and the sliding tray 136 to retract and extend as described above. It is also to be appreciated that the detent 936 may alternatively be located on the bottom wall 112 and the material free region 940 may alternatively be located on the rack 916. Alternatively the detent 936 and material free region 940 may be respectively located on the pinion 928 and the bottom wall 112 or vice versa. In addition, two or more detents can be variously located to define different positions for receiving two or more different sized batteries.

In one instance, a dial grip 933 or a key such as half moon shaped handle that is pivotally attached to the pinion 928 is used to rotate the pinion 928. With the key, the user pivots the key outwardly away from the bottom wall 112 and the charger 100 and turns the key to rotate the pinion 928 to cause the sliding tray 136 to retract or extend. For instance, the key may pivot from a position where it is substantially parallel to the bottom wall 112 up to a position to where it is substantially perpendicular to the bottom wall 112. When the sliding tray 136 is at a desired position, the key can be pivoted back to the pinion 928 The key may include a detent such as the detent 936 to substantially prevent the pinion 928 from rotating when the key is pivoted to the position substantially parallel to the wall 112.

It is to be appreciated that the constant spring (FIG. 8) or rack and pinion (FIGS. 9-11) may be implemented in conjunction with the either or both of the spring-loaded plunger (FIGS. 5 and 6, and 7).

The invention has been described with reference to the preferred embodiments. Of course, modifications and alterations will occur to others upon reading and understanding the preceding description. It is intended that the invention be construed as including all such modifications and alterations insofar as they come within the scope of the appended claims and the equivalents thereof.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An apparatus, comprising:
    a housing having a first wall;
    a sliding tray having a fixed support and a second wall that is generally parallel to the first wall, the second wall having a material free region and the fixed support being positioned away from the first wall and the second wall, wherein the sliding tray slides between a retracted position and an extended position in which the first and second walls define a battery receiving region in the sliding tray;
    a spring loaded plunger slidable through the material free region of the second wall and coupled to the fixed support of the sliding tray, wherein the spring loaded plunger is urged toward the first wall;
    a first battery contact provided in the first wall; and
    a second battery contact provided in the spring loaded plunger, wherein the first and second battery contacts electrically communicate with battery charging circuitry.

2. The apparatus of claim 1, wherein the second battery contact slides into a cavity behind the second wall as the sliding tray moves to the retracted position.

3. The apparatus of claim 1, wherein the second battery contact comes into physical contact with the first battery contact as the sliding tray moves to the retracted position, which causes the second battery contact to slide, relative to the second wall, in the material free region of the second wall.

4. The apparatus of claim 1, wherein the sliding tray slides away from the housing to a first position at which the pair of battery contacts receive a first battery of a first size and a second position at which the pair of battery contacts receive a second battery of a second size and a second position.

5. The apparatus of claim 4, wherein the first position corresponds to an intermediate position between the retracted position and the extended position, and the second position corresponds to the extended position.

6. The apparatus of claim 1, wherein the sliding tray further comprises contact support brackets proximate to the material free region that facilitate alignment of the second electrical contacts.

7. The apparatus of claim 1, wherein the spring-loaded plunger carries the second battery contact to a first position for receiving a first battery of a first size and a second position for receiving a second battery of a different size.

8. The apparatus of claim 7, wherein the spring-loaded plunger includes a latch that holds the spring-loaded plunger at the first position.

9. The apparatus of claim 1, further including a plurality of gears that mechanically cooperate to slide the sliding tray between the retracted position and extended position.

10. The apparatus of claim 9, wherein the plurality of gears includes:
    a first generally circular shaped gear having a first set of teeth, wherein the first gear is rotatably coupled to the housing; and
    a second generally linear shaped gear having a second set of teeth, wherein the second gear is mechanically fixed to the sliding tray,
    wherein the first set of teeth physically engages the second set of teeth as the first gear rotates causing the second gear to translate, which slides the sliding tray.

11. The apparatus of claim 10, further including a latch that latches the second gear at a position that corresponds to a position at which a first, smaller sized battery is received between the first and second battery contacts.

12. The apparatus of claim 10, wherein the first gear is a pinion and the second gear is a rack.

13. The apparatus of claim 1, further including a spring that urges the sliding tray to slide, relative to the housing, to the retracted position.

14. The apparatus of claim 13, wherein the spring includes a wound coil that resists unwinding and wherein a first end of the spring is unwound and mechanically fixed to the housing and a second end of the spring is mechanically fixed to the sliding tray.

15. The apparatus of claim 13, wherein sliding the sliding tray away from the housing unwinds the coil.

16. The apparatus of claim 13, further including a latch that latches the spring at a position that corresponds to a position at which a battery is received between the first and second battery contacts.

17. The apparatus of claim 1, wherein the pair of battery contacts receives a AAA sized secondary battery at a first battery receiving position and a AA sized secondary battery at a second battery receiving position.

18. The apparatus of claim 16, wherein the battery is a nickel metal hydride battery.

19. The apparatus of claim 1, further including a second pair of battery contacts that concurrently receives a first battery, wherein the first contact and the second contact receive a second battery, and wherein the first and second batteries are one of a same size or a different size.

20. An apparatus, comprising:
    a housing having a first wall;
    a sliding tray having a second wall that is generally parallel to the first wall, wherein the sliding tray slides between a retracted position and an extended position in which the first and second walls define a battery receiving region in the sliding tray;
    a first battery contact provided in the first wall;
    a second battery contact proximate to the second wall, wherein the first and second battery contacts electrically communicate with battery charging circuitry; and
    a spring-loaded plunger positioned within a material free region of the second wall that slides the second battery contact with respect to the second wall in a direction that changes a distance between the first and second battery contacts so that the pair of battery contacts is configured to receive different sized batteries.

21. The apparatus of claim 20, wherein the spring-loaded plunger exerts a force in a direction of the first battery contact that causes the second battery contact to physically contact the battery terminal.

22. The apparatus of claim 20, wherein the spring-loaded plunger slides to a first position so that the pair of contacts receives a battery of a first size or a second position so that the pair of contacts receives a different sized battery.

23. The apparatus of claim 20, wherein the spring-loaded plunger includes:
    a sliding plunger mechanically coupled to the second electrical contact; and
    a spring disposed between the sliding plunger and a fixed wall,
    wherein the spring urges the plunger to slide towards the first electrical contact, which causes the second electrical contact to slide towards the first electrical contact.

24. The apparatus of claim 20, further including a latch that latches the sliding tray in the retracted position.

25. The apparatus of claim 24, wherein the spring is compressed when the sliding tray is in the retracted position, and wherein the spring force causes the sliding tray to automatically slide away from the housing when the latch is released.

26. The apparatus of claim 20, wherein the sliding tray has a protrusion and the housing has a complementary material free region, and wherein the protrusion engages the material free region to latch the sliding tray at the retracted position.

27. The apparatus of claim 20, wherein the spring-loaded plunger includes a latch that latches the sliding tray at a first position for receiving a first battery of a first size when the sliding tray is in the extended position and at a second position for receiving a second battery of a different size when the sliding tray is in the extended position.

28. The apparatus of claim 20, wherein the spring-loaded plunger includes:
    a first member having a first set of teeth, wherein the first member carries the second contact; and
    a second member having a second set of teeth, wherein the second member is affixed to a spring,
    wherein the first and second sets of teeth cooperate to rotate the second member with respect to the first member to alternately position the second member so that the spring-loaded plunger toggles between first and second battery receiving positions for receiving different size batteries.

29. The apparatus of claim 28, further including an arm that holds the first member at a rotational position to hold the spring-loaded plunger at the first or second position.

30. An apparatus, comprising:
    a housing having a first wall;
    a sliding tray having a second wall that is generally parallel to the first wall, wherein the sliding tray slides between a retracted position and an extended position in which the first and second walls define a battery receiving region in the sliding tray;

a spring having a first end affixed to the housing and a second end affixed to the sliding tray, wherein the spring pulls the sliding tray to the retracted position;

a first battery contact provided in the first wall;

a second battery contact proximate the second wall, wherein the first and second battery contacts electrically communicate with battery charging circuitry;

a releasable latch, wherein the releasable latch holds the sliding tray in an intermediate position between the retracted and extended position, and wherein the intermediate position corresponds to a first battery size and the extended position corresponds to a second battery size; and a spring-loaded plunger positioned within a material free region of the second wall that slides the second battery contact with respect to the second wall in a direction that changes a distance between the first and second battery contacts.

31. The apparatus of claim 30, wherein the spring includes a wound coil that produce a force that resists unwinding of the coil.

32. The apparatus of claim 31, wherein the sliding tray includes a fixed rod to which the constant force spring is wound.

33. The apparatus of claim 30, further including a latch that holds the sliding tray at an intermediate position.

34. The apparatus of claim 30, wherein the first battery contact, the second battery contact, or both the first and the second battery contacts slides with respect to corresponding walls so as to change the distance between the pairs of battery contacts.

35. An apparatus, comprising:

a housing having a first wall;

a sliding tray having a second wall that is generally parallel to the first wall, wherein the sliding tray slides between a retracted position and an extended position in which the first and second walls define a battery receiving region in the sliding tray;

a plurality of gears that moves the sliding tray between the closed and the extended positions; and a first battery contact provided in the first wall;

a second battery contact proximate the second wall, wherein the first and second battery contacts electrically communicate with battery charging circuitry, wherein the plurality of gears slides the sliding tray to a first position between the retracted and extended position at which the pair of battery contacts accommodate a first size battery and a second position between the retracted and extended position at which the pair of battery contacts accommodate a second size battery; and a spring-loaded plunger positioned within a material free region of the second wall that slides the second battery contact with respect to the second wall in a direction that changes a distance between the first and second battery contacts.

36. The apparatus of claim 35, wherein the plurality of gears includes:

a first generally circular shaped gear having a first set of teeth, wherein the first gear is rotatably coupled to the housing; and a second generally linear shaped gear having a second set of teeth, wherein the second gear is mechanically fixed to the sliding tray, wherein the first set of teeth physically engages the second set of teeth as the first gear rotates causing the second gear to translate, which slides the sliding tray.

37. The apparatus of claim 36, wherein the gears cooperate such that rotational motion of the first gear translates to linear motion of the second gear that is used to slide the sliding tray between positions.

38. The apparatus of claim 36, further include a third generally linear shaped gear having a third set of teeth, wherein the third gear is mechanically fixed to the housing, and wherein the first set of teeth physically engages the third set of teeth as the first gear rotates causing the first gear to translate as the first set of teeth of the first gear engages the second set of teeth of the second gear.

39. The apparatus of claim 38, wherein the first gear is a pinion and the second and third gears are racks.

40. The apparatus of claim 36, further including a latch that latches the second rack at a position that corresponds to a position at which a first, smaller sized battery is received between the first and second battery contacts.

* * * * *